United States Patent
Cox et al.

(10) Patent No.: US 8,352,646 B2
(45) Date of Patent: Jan. 8, 2013

(54) DIRECT ACCESS TO CACHE MEMORY

(75) Inventors: Jason A. Cox, Raleigh, NC (US); Omer Heymann, Tzofit (IL); Nadav Levison, Herut (IL); Kevin C. Lin, Raleigh, NC (US); Eric F. Robinson, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/969,651

(22) Filed: Dec. 16, 2010

(65) Prior Publication Data

US 2012/0159082 A1   Jun. 21, 2012

(51) Int. Cl.
  *G06F 13/28* (2006.01)
(52) U.S. Cl. ............ 710/23; 711/118; 711/135; 711/141
(58) Field of Classification Search .................. None
  See application file for complete search history.

(56) References Cited

U.S. PATENT DOCUMENTS

| | | | | |
|---|---|---|---|---|
| 5,809,548 | A * | 9/1998 | Chang et al. | 711/166 |
| 6,219,759 | B1 * | 4/2001 | Kumakiri | 711/137 |
| 7,055,003 | B2 | 5/2006 | Cargnoni et al. | |
| 7,177,986 | B2 | 2/2007 | Rowlands et al. | |
| 7,228,386 | B2 | 6/2007 | Rowlands et al. | |
| 7,424,553 | B1 * | 9/2008 | Borrelli et al. | 709/250 |
| 2005/0216610 | A1 * | 9/2005 | Johns et al. | 710/22 |
| 2007/0079070 | A1 * | 4/2007 | Piry et al. | 711/118 |
| 2008/0104711 | A1 * | 5/2008 | Johns et al. | 726/27 |
| 2008/0294807 | A1 * | 11/2008 | Daly et al. | 710/22 |
| 2009/0222627 | A1 * | 9/2009 | Reid | 711/135 |

OTHER PUBLICATIONS

"DMA Cache: Using On-Chip Storage to Architecturally Seperate I/O Data from CPU Data for Improving I/O Performance," Tang et al., 2009, IEEE, pp. 1-12.*
Method for an IOH data-in cache to speed up DMA engine performance, Anonymous, Apr. 11, 2006, IP.com, pp. 1-6.*

* cited by examiner

*Primary Examiner* — Chun-Kuan Lee
*Assistant Examiner* — Dayton Lewis-Taylor
(74) *Attorney, Agent, or Firm* — Edward J. Lenart; Daniel H. Schnurmann; Biggers & Ohanian, LLP.

(57) ABSTRACT

Methods and apparatuses are disclosed for direct access to cache memory. Embodiments include receiving, by a direct access manager that is coupled to a cache controller for a cache memory, a region scope zero command describing a region scope zero operation to be performed on the cache memory; in response to receiving the region scope zero command, generating a direct memory access region scope zero command, the direct memory access region scope zero command having an operation code and an identification of the physical addresses of the cache memory on which the operation is to be performed; sending the direct memory access region scope zero command to the cache controller for the cache memory; and performing, by the cache controller, the direct memory access region scope zero operation in dependence upon the operation code and the identification of the physical addresses of the cache memory.

16 Claims, 4 Drawing Sheets

DIRECT ACCESS TO CACHE MEMORY

BACKGROUND OF THE INVENTION

1. Field of the Invention

The field of the invention is data processing, or, more specifically, methods and apparatuses for direct access to cache memory.

2. Description of Related Art

Cache memories may be used to store data from main memory of a computer. Typically, a cache controller is used to manage and control access to a cache memory. Commands received by the cache controller may specify a memory address of the main memory. In response to receiving a command, a cache controller may use a cache directory to determine if a block of memory is within the cache memory. That is, the software providing the command to the cache controller does not know whether the block of memory is within the cache memory. If the software wants to flush or invalidate the cache memory, the instructions from the software to the cache controller may be inefficient because the software does not know with certainty which memory blocks are active in the cache at any particular moment in time.

SUMMARY OF THE INVENTION

Methods and apparatuses are disclosed for direct access to cache memory. Embodiments include receiving, by a direct access manager that is coupled to a cache controller for a cache memory, a region scope zero command describing a region scope zero operation to be performed on the cache memory; in response to receiving the region scope zero command, generating, by the direct access manager, a direct memory access region scope zero command, the direct memory access region scope zero command having an operation code and an identification of the physical addresses of the cache memory on which the operation is to be performed; sending, by the direct access manager, the direct memory access region scope zero command to the cache controller for the cache memory; and performing, by the cache controller, the direct memory access region scope zero operation in dependence upon the operation code and the identification of the physical addresses of the cache memory on which the direct memory access region scope zero operation is to be performed.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
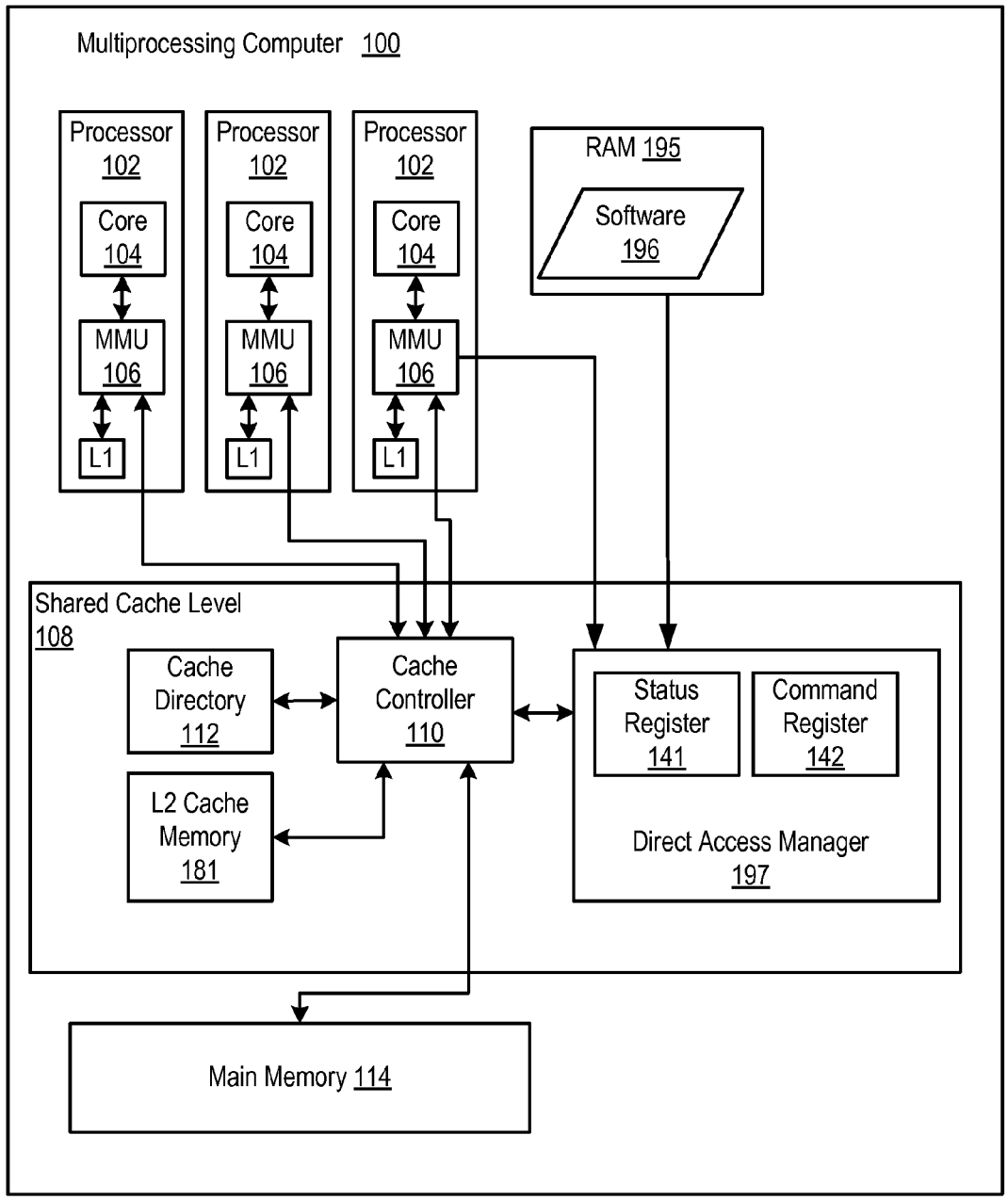
FIG. 1 sets forth a functional block diagram of an example of a computer that implements direct access to cache memory according to embodiments of the present invention.

Example methods and apparatuses for direct access to cache memory according to embodiments of the present invention are described with reference to the accompanying drawings, beginning with FIG. 1. FIG. 1 sets forth a functional block diagram of an example of a computer (100) that implements direct access to cache memory according to embodiments of the present invention.

The example computer (100) in FIG. 1 includes several computer processors (102). Each processor (102) includes a compute core (104) that is coupled for memory operations through a memory management unit ('MMU') (106) to a shared cache level (108) and to main memory (114). The first shared cache level (109) includes a cache directory (112), a cache controller (110), an L2 cache (181), and a direct access manager (197).

Each of the processors (102) of FIG. 1 includes L1 memory. L1 is a relatively small, high speed cache fabricated into the processor itself, on the same chip. The MMU (106) includes address translation logic, a translation lookaside buffer, controls for the on-processor cache L1, and so on.

The main memory (114) is the principal, random access store of program data and program instructions for data processing on the computer (100). Main memory (114) is characterized by memory latency, the time required for a memory access, a read or write to or from main memory. Main memory (114) implements a single extent of physical address space shared among the processor (102).

The cache memories L1 and L2 (181) are specialized segments of memory used by the processors (102) to reduce memory access latency. Each cache memory is smaller and faster than main memory, and each cache memory stores copies of data from frequently used main memory locations. When a processor (102) needs to read from or write to a location in main memory (114), it first checks whether a copy of that data, a "cache line," is in the cache memory (181). If so, the processor immediately reads from or writes to the cache memory (181), which is much faster than reading from or writing to the main memory (114). As long as most memory accesses are cached memory locations, the average latency of memory accesses will be closer to the cache latency than to the latency of main memory. As mentioned, main memory (114) is much slower than any cache memory, and cache misses extract a heavy toll in memory access latency.

Cache memory is organized in blocks of data referred to as 'cache lines.' Each cache line in different designs may range in size from 8 to 512 bytes or more. The size of a cache line typically is larger than the size of the usual access requested by a CPU instruction, which ranges from 1 to 16 bytes—the largest addresses and data typically handled by current 32 bit- and 64 bit-architectures being 128 bits or 16 bytes in length. Each cache line is characterized by a 'tag' composed of most significant bits of the beginning address where the contents of the cache line are stored in main memory.

In the example of FIG. 1, the processors (102) utilize a multi-level cache with two levels, represented by the L1 cache and the L2 cache (181). Multi-level caches address the tradeoff between cache latency and hit rate. Larger caches have better hit rates but longer latency. To address this tradeoff, many computers use multiple levels of cache, with small fast caches backed up by larger slower caches. Multi-level caches generally operate by checking the smallest Level 1 (L1) cache first; if it hits, the processor proceeds at high speed. If the smaller cache misses, the next larger cache (L2) is checked, and so on, before main memory is checked. The example computer of FIG. 1 implements two cache levels, but this is only for ease of explanation, not for limitation. Many computers implement additional levels of cache, three or even four cache levels. Some processors implement as many as three levels of on-chip cache. For example, the Alpha 21164™ has a 96 KB on-die L3 cache, and the IBM POWER4™ has a 256 MB L3 cache off-chip, shared among several processors.

The cache controller (110) includes the cache directory (112) that is a repository of information regarding cache lines in the cache memories. The directory records, for each cache line in all of the cache memory in the computer, the identity of the cache line or cache line "tag," the cache line state, MODIFIED, SHARED, INVALID, and so on, and a bit vector that specifies for each processor whether a copy of a cache line in a low level shared cache is stored in an upper cache level. The MMUs (106) and the cache controllers (110) consult and update the information in the cache directory (112) with every cache operation on a compute node. The cache controller (110), connected directly to the L2 cache (181), has no direct connection to the L1 cache—and obtains information about cache lines in the L1 cache from the cache directory (112).

The cache controller (110) is a logic circuit that manages cache memory, providing an interface among processors (102), cache memories (L1, L2), and main memory (114). Although the cache controller (110) here is represented externally to the processors (102), cache controllers on modern computers are often integrated directly into a processor or an MMU. In this example, the MMUs (106) in fact include cache control logic for the L1 caches.

The direct access manager (197) is a logic circuit that implements direct access to the cache memory (181) in accordance with the invention. The direct access manager (197) of FIG. 1 is configured to receive a command describing an operation to be performed on the cache memory (181); in response to receiving the command, generate a direct memory access command, the direct memory access command having an operation code and an identification of the physical addresses of the cache memory (181) on which the operation is to be performed; and send the direct memory access command to the cache controller (110) for the cache memory (181). In response to receiving the direct memory access command, the cache controller (181) is configured to perform the operation in dependence upon the operation code and an identification of the physical addresses of the cache memory (181) on which the operation is to be performed.

The direct access manager (197) of FIG. 1 includes a status register (141) for storing an identification of the status of the direct access manager (197). The status may include any number of parameters associated with the direct access manager (197) and directly accessing the cache memory (181). For example, the status may indicate whether the direct access manager is busy, a last command received by the direct access manager, and a processor that sent the last command, and so on. The direct access manager (197) of FIG. 1 also includes a command register (142) for storing commands. For example, software (196) within random access memory (195) within the multiprocessing computer (100) may include instructions that when executed cause one of the processors (102) to write a command to the command register (142). The command (142) may also originate from the MMU (106) within the processor (102).

Figure 2:
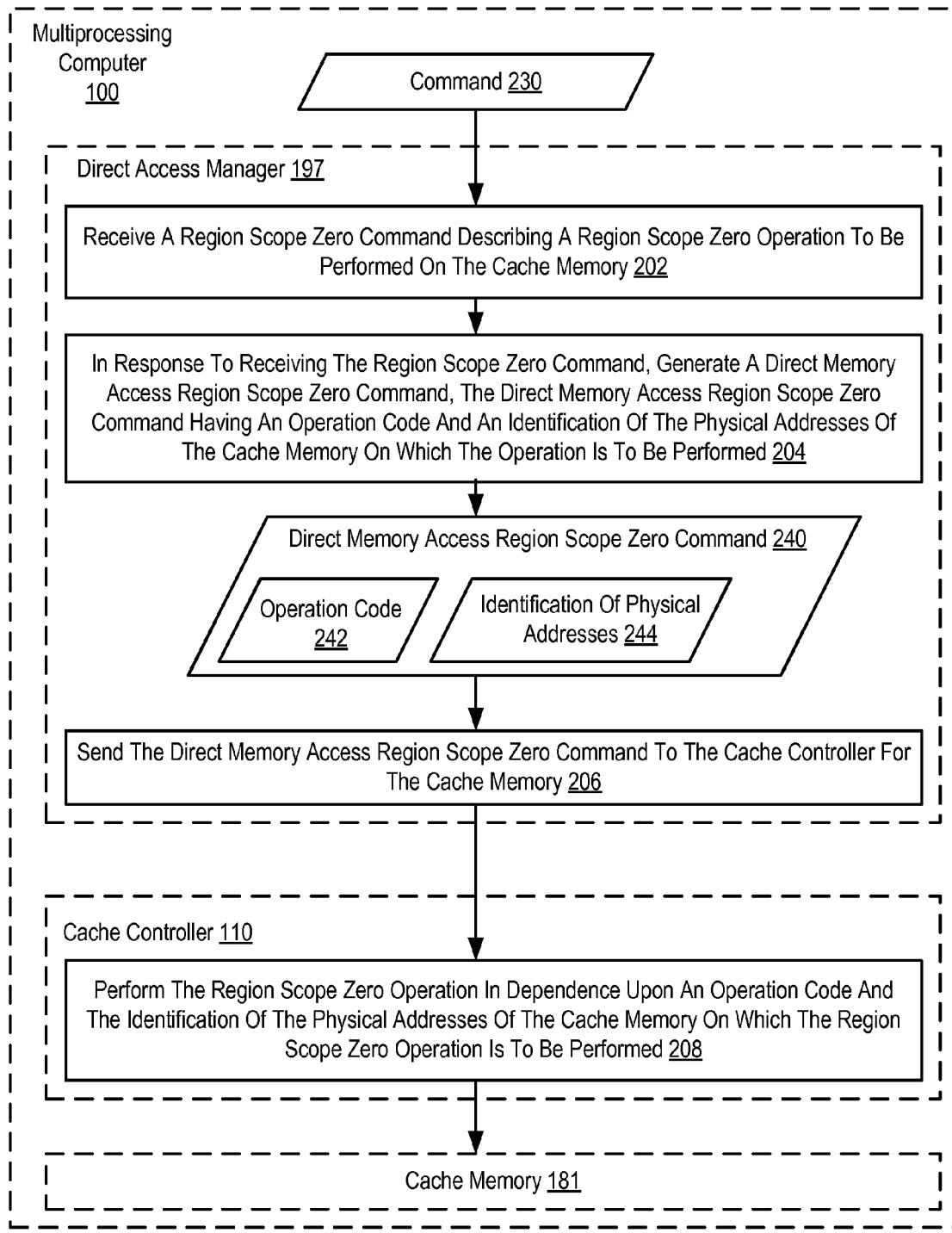
FIG. 2 sets forth a flow chart illustrating an example of a method for direct access to the cache memory according to embodiments of the present invention.

For further explanation, FIG. 2 sets forth a flow chart illustrating an example of a method for direct access to the cache memory according to embodiments of the present invention. The method of FIG. 2 includes receiving (202), by a direct access manager (197) that is coupled to a cache controller (110) for a cache memory (181), a region scope zero command (230) describing a region scope zero operation to be performed on the cache memory (181). Receiving (202) a region scope zero command (230) describing a region scope zero operation to be performed on the cache memory (181) may be carried out by detecting a write to the command register (142) of the direct access manager (197). For example, one of the processors (102) may write the region scope zero command (230) to the command register (142).

The method of FIG. 2 also includes in response to receiving the region scope zero command (230), generating (204), by the direct access manager (197), a direct memory access command region scope zero (240), the direct memory access region scope zero command (240) having an operation code (242) and an identification (244) of the physical addresses of the cache memory (181) on which the operation is to be performed. Generating (204) a direct memory access command (240) in response to receiving the region scope zero command (230) may be carried out by examining the received command (230) to determine the type of operation associated with the received command (230). For example, the direct access manager (197) may be configured to perform an operation on the entire cache memory using a 'cache scope'(CS) command, on a portion of the cache memory (181) using a 'region scope' (RS) command, and on a single line of the cache memory (181) using a 'line scope' (LS) command. With each type of command, the direct access memory (197) provides the physical address of cache memory (181) to enable the cache controller (181) to perform the operation without performing a lookup.

The direct access manager (197) may be configured to perform a cache scope invalidate (C SI) command that invalidates the entire contents of the cache without receiving a bus command. With the CSI command, the direct access manager (197) generates an 'L2 cache block invalidate' operation for each line in the cache memory (181).

The direct access manager (197) may be configured to perform a cache scope flush (CSF) command that flushes the entire contents of the cache memory (181). The direct access manager (197) generates an "L2 cache flush" command for each line of the cache memory (181). For example, the first flush command targets "way-0" in congruence class (cgc) 0 of the cache memory (181). Rather than doing a lookup using a real address, the cache memory uses the physical address of the cache memory (181) to read the contents of the cache directory. If the line is locally modified, then the cache memory (181) writes the cache line to the main memory (114) using the tag that is stored in the cache's directory to create the target address. The direct access manager (197) may increment to the next shared cache memory (not pictured) and send a flush command to cgc-0, way-0 in that cache memory.

The direct access manager (197) may be configured to perform a region scope zero coherency command (RSZC) that includes performing, by the direct access manager (197), a lookup of a desired memory real address in the cache directory (112); and if the cache line is found in the cache directory (112), instructing, by the direct access manager (197), the cache directory (112) to invalidate the cache line from its current location and establish and zero the line in the cache location specified by the RSZC command; and if the cache line is not found, instructing, by the direct access manager (197), the cache memory (181) to establish and zero the cache line. In the RSZC operation, if the cache line is not in the cache or is in a shared state, then a bus operation may be performed in order to maintain coherency with other caches in the system. In a single cache system, coherency is not an issue, however, the old copy of the cache line is still invalidated.

The direct access manager (197) may be configured to perform a region scope zero non-coherency command (RSZNC) that includes performing, by the direct access manager (197), a lookup of a desired cache location in the cache directory (112); and if the cache line is found in the cache directory (112), instructing, by the direct access manager (197), the cache directory (112) to invalidate the cache line. The RSZNC operation may be performed by the direct access manager (197) during a power-on-reset (POR) sequence, wherein during the POR sequence, firmware instructions are copied to the cache memory (181). In the RSZNC operation, cache lines are established in the cache (and zeroed) without making bus commands. This is especially useful during a POR sequence to enable the cache before the memory controller. In this case, firmware is able to run more quickly and also a large, fast scratch pad is established in the cache for storing intermediate results during a boot. The RSZNC operation can be used any time to quickly establish a block of memory in the cache as a scratch pad. In this case, hardware is not maintaining coherency, the software has the responsibility to know when the cache may be used if there are coherent caches in the system.

The direct access manager (197) may be configured to perform a line scope read directory (LSRD) command that reads directory entries to determine the tag, coherency state, and other control bits of a cache line. In response to the LSRD command, a single cache line directory entry is read.

The direct access manager (197) may be configured to perform a line scope write directory (LSWD) command that writes directory entries to restore the state of the cache memory at the start of a debug session. The LSWD command may also be useful in hardware verification or during debug to create a particular cache scenario.

The direct access manager (197) may be configured to perform a line scope read cache line data (LSRC) command for reading data from the cache memory (181).

The direct access manager (197) may be configured to perform a line scope write cache line data (LSWC) command for writing data from the cache memory (181).

The direct access manager (197) may be configured to perform a line scope lookup (LSLK) command for looking up tags in the cache memory (181). When debugging/developing software, it may be useful to know whether a particular cache line is present in the cache memory (181) without dumping out the entire directory. The LSLK command is used to perform a lookup in the cache directory for the line of interest and if found, the command dumps the contents of the directory entry (tag, coherency state, etc) into a software-accessible register; if not found the miss information is recorded in that same software-accessible register.

The method of FIG. 2 includes sending (206), by the direct access manager (197), the direct memory access region scope zero command (240) to the cache controller (110) for the cache memory (181). Sending (206) the direct memory access region scope zero command (240) to the cache controller (110) for the cache memory (181) may be carried out by transmitting data to the cache controller (110), where the data instructs the cache controller (110) to perform the operation associated with the region scope zero command (230).

The method of FIG. 2 also includes performing (208), by the cache controller (110), the operation in dependence upon the operation code (242) and the identification (244) of the physical addresses of the cache memory (181) on which the operation is to be performed. Performing (208) the operation in dependence upon the operation code (242) and the identification (244) of the physical addresses of the cache memory (181) on which the operation is to be performed may be carried out by using the physical address of the cache memory (181) when instructing the cache controller (181) to perform an operation. By using the physical address of the cache instead of a memory address of the main memory (114), the cache controller (110) can avoid performing a lookup and may have greater control over the cache memory (181).

Figure 3:
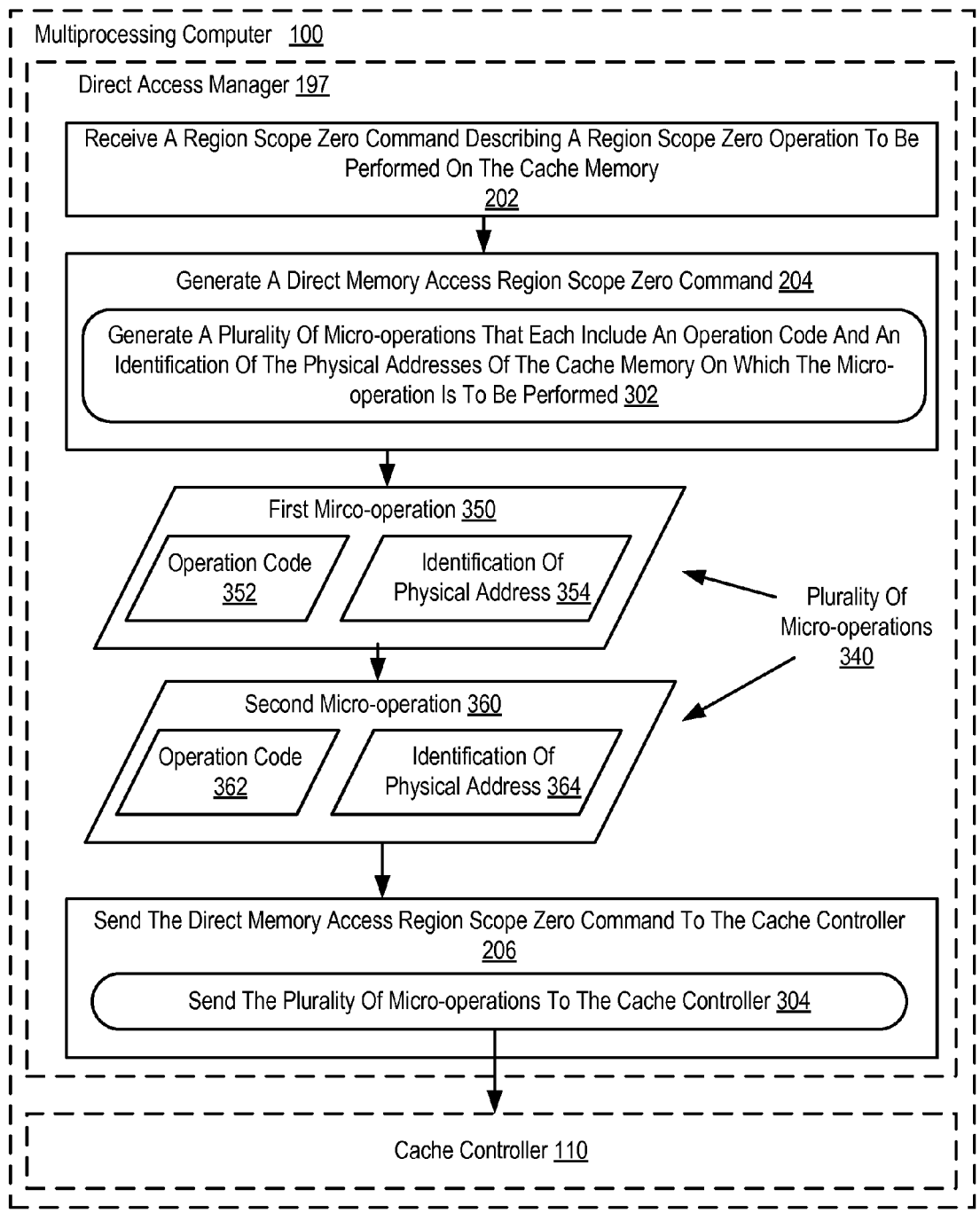
FIG. 3 sets forth a flow chart illustrating another example of a method for direct access to the cache memory according to embodiments of the present invention.

For further explanation, FIG. 3 sets forth a flow chart illustrating another example of a method for direct access to the cache memory according to embodiments of the present invention. The method of FIG. 3 includes the following elements of the method of FIG. 2: receiving (202), by a direct access manager (197) that is coupled to a cache controller (110) for a cache memory (181), a command (230) describing an operation to be performed on the cache memory (181); in response to receiving the region scope zero command (230), generating (204), by the direct access manager (197), a direct memory access command (240), the direct memory access region scope zero command (240) having an operation code (242) and an identification (244) of the physical addresses of the cache memory (181) on which the operation is to be performed; and sending (206), by the direct access manager (197), the direct memory access region scope zero command (240) to the cache controller (110) for the cache memory (181).

The elements of FIG. 3 that differ from the method of FIG. 2 are illustrated in FIG. 3 with a dashed line. More particularly, those elements include: generating (302) a plurality (340) of micro-operations that each include an operation code (352, 362) and an identification (354, 364) of the physical addresses of the cache memory (181) on which the micro-operation is to be performed; sending (304) the plurality (340) of micro-operations to the cache controller (110).

In the method of FIG. 3, generating (204) a direct memory access command (240) includes generating (302) a plurality (340) of micro-operations that each include an operation code (352, 362) and an identification (354, 364) of the physical addresses of the cache memory (181) on which the micro-operation is to be performed. Generating (302) a plurality (340) of micro-operations that each include an operation code (352, 362) and an identification (354, 364) of the physical addresses of the cache memory (181) on which the micro-operation is to be performed may be carried out by performing, by the direct access manager (197), a lookup of a desired cache location at the cache memory (181); and if the cache line if found in the cache memory (181), instructing, by the direct access manager (197), the cache memory (181) to invalidate the cache line.

In the method of FIG. 3, sending (206) the direct memory access region scope zero command (240) to the cache controller (110) for the cache memory (181) includes sending (304) the plurality (340) of micro-operations to the cache controller (110). Sending (304) the plurality (340) of micro-operations to the cache controller (110) may be carried out by incrementing the address of each micro-operation in relation to a previous micro-operation. The format of the micro-operations is such that the cache controller (110) treats each micro-operation as an extension of an instruction set architecture (ISA) of one of the processors (102).

Figure 4:
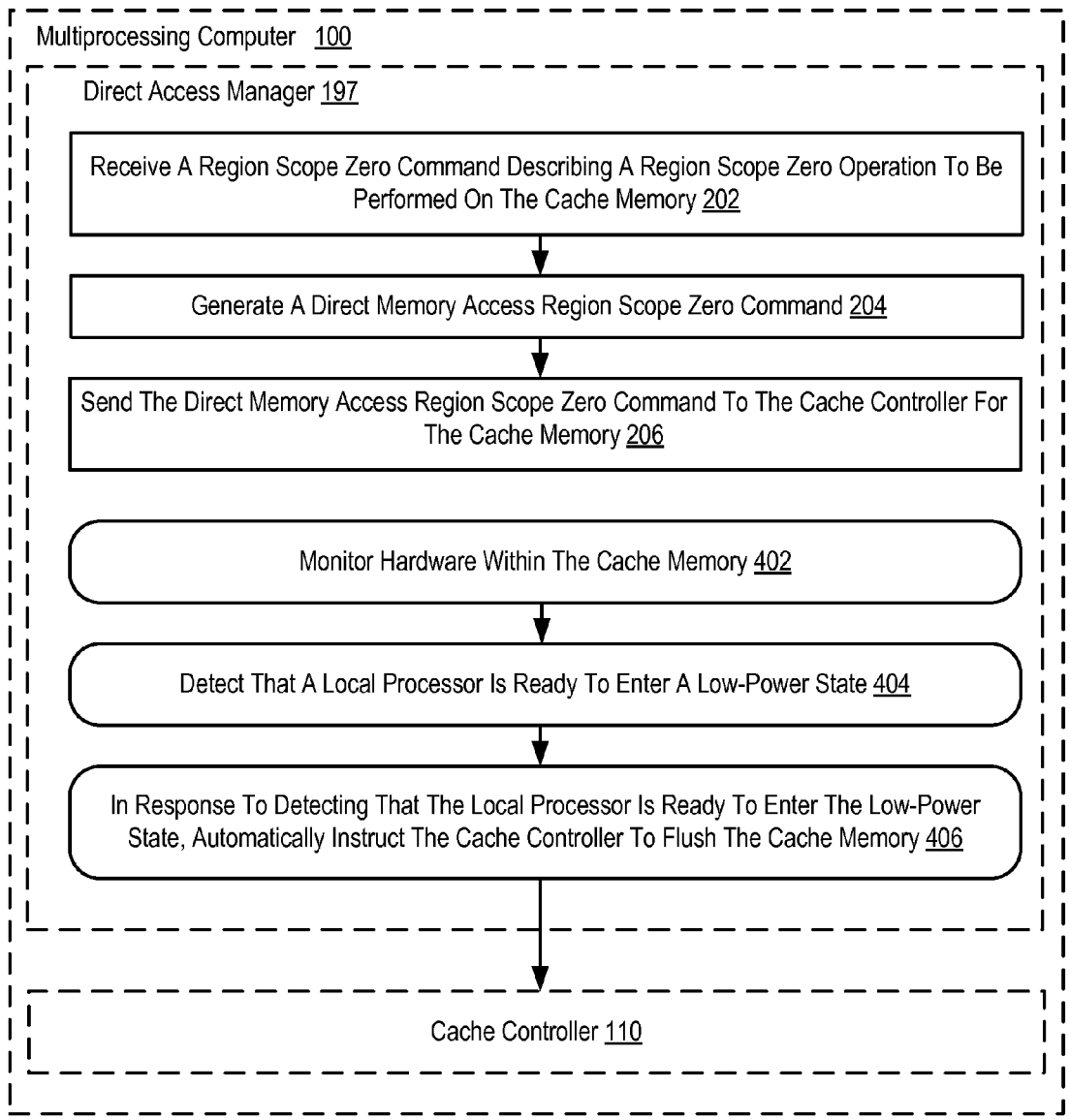
FIG. 4 sets forth a flow chart illustrating another example of a method for direct access to the cache memory according to embodiments of the present invention.

For further explanation, FIG. 4 sets forth a flow chart illustrating another example of a method for direct access to the cache memory according to embodiments of the present invention. The method of FIG. 4 includes the following elements of the method of FIG. 2: receiving (202), by a direct access manager (197) that is coupled to a cache controller (110) for a cache memory (181), a command (230) describing an operation to be performed on the cache memory (181); in response to receiving the region scope zero command (230), generating (204), by the direct access manager (197), a direct memory access command (240), the direct memory access region scope zero command (240) having an operation code (242) and an identification (244) of the physical addresses of the cache memory (181) on which the operation is to be performed; and sending (206), by the direct access manager (197), the direct memory access region scope zero command (240) to the cache controller (110) for the cache memory (181).

The elements of FIG. 4 that differ from the method of FIG. 2 are illustrated in FIG. 4 with a dashed line. More particularly, those elements include: monitoring (402), by the direct access manager (197), hardware within the cache memory (181); detecting (404), by the direct access manager (197), that a local processor is ready to enter a low-power state; and in response to detecting that the local processor is ready to enter the low-power state, automatically instructing (406), by the direct access manager (197), the cache controller (110) to flush the cache memory (181).

The method of FIG. 4 includes monitoring (402), by the direct access manager (197), hardware within the cache memory (181). Monitoring (402) hardware within the cache memory (181) may be carried out by detecting a hardware event associated with a component of the computer (100). For example, the hardware event may indicate that the component is ready to enter a power savings state, such as a low-power state.

The method of FIG. 4 includes detecting (404), by the direct access manager (197), that a local processor is ready to enter a low-power state. Detecting (404) that a local processor is ready to enter a low-power state may be carried out by receiving via a bus a signal indicating that one of the processors (102) is prepared to enter a low-power state.

The method of FIG. 4 includes in response to detecting that the local processor is ready to enter the low-power state, automatically instructing (406), by the direct access manager (197), the cache controller (110) to flush the cache memory (181). Automatically instructing (406) the cache controller (110) to flush the cache memory (181) in response to detecting that the local processor is ready to enter the low-power state may be carried out by performing a cache scope flush (CSF) command that flushes the entire contents of the cache memory (181).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for direct access to cache memory, the method comprising:
   receiving, by a direct access manager that is coupled to a cache controller for a cache memory, a region scope zero non-coherency command describing a region scope zero non-coherency operation to be performed on the cache memory;
   in response to receiving the region scope zero non-coherency command,
   performing, by the direct access manager, a lookup of a desired cache line in a cache directory, the desired cache line corresponding to the region scope zero non-coherency command;
   if the cache line is found in the cache directory, instructing, by the direct access manager, the cache directory to invalidate the cache line; and
   if the desired cache line is not found in the cache directory, establishing and zeroing, by the direct access manager, the desired cache line in the cache memory without making bus commands.

2. The method of claim 1, wherein the command is received from a module of software.

3. The method of claim 1, wherein the command is received from a memory management unit of a processor that manages level one cache for the processor.

4. The method of claim 1 further comprising generating a direct memory access command including generating a plurality of micro-operations that each include an operation code and an identification of the physical addresses of the cache memory on which the micro-operation is to be performed.

5. The method of claim 3 further comprising sending the plurality of micro-operations to the cache controller.

6. The method of claim 1, wherein the direct access manager includes a status register for storing an identification of the status of the direct access manager.

7. The method of claim 6, wherein the status is selected from the group consisting of whether the direct access manager is busy, a last command received by the direct access manager, and a processor that sent the last command.

8. The method of claim 1, further comprising:
   monitoring, by the direct access manager, hardware within the cache memory;
   detecting, by the direct access manager, that a local processor is ready to enter a low-power state; and
   in response to detecting that the local processor is ready to enter the low-power state, automatically instructing, by the direct access manager, the cache controller to flush the cache memory.

9. An apparatus for direct access to cache memory, the apparatus comprising:
   the cache memory;
   a direct access manager coupled to a cache controller for the cache memory, the direct access manager including hardware configured to:
      receive a region scope zero non-coherency command describing a region scope zero non-coherency operation to be performed on the cache memory;
      in response to receiving the region scope zero non-coherency command
      perform a lookup of a desired cache line in a cache directory, the desired cache line corresponding to the region scope zero non-coherency command;
      if the cache line is found in the cache directory, instruct the cache directory to invalidate the cache line; and
      if the desired cache line is not found in the cache directory, establish and zero the desired cache line in the cache memory without making bus commands.

10. The apparatus of claim 9, wherein the command is received from a module of software.

11. The apparatus of claim 9, wherein the command is received from a memory management unit of a processor that manages level one cache for the processor.

12. The apparatus of claim 9, wherein the hardware is configured to generate a direct memory access command including generating a plurality of micro-operations that each include an operation code and an identification of the physical addresses of the cache memory on which the micro-operation is to be performed.

13. The apparatus of claim 11, wherein the hardware is configured to send the plurality of micro-operations to the cache controller.

14. The apparatus of claim 9, wherein the direct access manager includes a status register for storing an identification of the status of the direct access manager.

15. The apparatus of claim 14, wherein the status is selected from the group consisting of whether the direct access manager is busy, a last command received by the direct access manager, and a processor that sent the last command.

16. The apparatus of claim 9, wherein the direct access manager includes hardware configured to:
   monitor hardware within the cache memory;
   detect that a local processor is ready to enter a low-power state; and
   in response to detecting that the local processor is ready to enter the low-power state, automatically instruct the cache controller to flush the cache memory.

* * * * *